(12) United States Patent
Hirai et al.

(10) Patent No.: US 8,505,399 B2
(45) Date of Patent: Aug. 13, 2013

(54) ELECTRIC ACTUATOR

(75) Inventors: Masanori Hirai, Gifu (JP); Yasuyuki Shirai, Gifu (JP); Tsunehisa Nomura, Gifu (JP); Koji Itoh, Gifu (JP)

(73) Assignee: Nabtesco Corporation, Tokyo (JP)

( * ) Notice: Subject to any disclaimer, the term of this patent is extended or adjusted under 35 U.S.C. 154(b) by 512 days.

(21) Appl. No.: 12/643,228

(22) Filed: Dec. 21, 2009

(65) Prior Publication Data

US 2010/0162838 A1    Jul. 1, 2010

(30) Foreign Application Priority Data

Dec. 26, 2008  (JP) ................................ 2008-333366
Jan. 21, 2009  (JP) ................................ 2009-010552

(51) Int. Cl.
*F16H 25/22*   (2006.01)

(52) U.S. Cl.
USPC .................................................. 74/39; 33/37

(58) Field of Classification Search
USPC ............ 74/89.33, 89.23, 89.37, 89.39, 89.25, 74/89.34, 89.35; 403/328, 315, 379.1, 379.6, 403/378; 292/252, 137, 251, 1; 244/99.2, 244/99.3, 99.5, 102 R, 102 A, 102 SL
See application file for complete search history.

(56) References Cited

U.S. PATENT DOCUMENTS

| | | | | |
|---|---|---|---|---|
| 2,444,886 A | * | 7/1948 | Vickers | 74/89.39 |
| 2,660,026 A | * | 11/1953 | Geyer | 60/709 |
| 2,701,478 A | * | 2/1955 | Riess | 74/89.38 |
| 3,430,305 A | * | 3/1969 | Geffner | 24/603 |
| 4,988,248 A | * | 1/1991 | Flux | 411/348 |
| 5,307,238 A | * | 4/1994 | Marcus | 348/837 |
| 5,950,997 A | * | 9/1999 | Metz | 267/255 |
| 6,832,540 B2 | * | 12/2004 | Hart | 92/24 |
| 7,216,581 B2 | * | 5/2007 | McAuley | 92/21 MR |
| 7,347,115 B2 | * | 3/2008 | Otaki et al. | 74/89.38 |
| 7,610,828 B2 | * | 11/2009 | Wingett et al. | 74/424.78 |
| 2007/0220998 A1 | * | 9/2007 | Kopecek | 74/89.39 |

FOREIGN PATENT DOCUMENTS

| | | |
|---|---|---|
| JP | 11-59592 | 3/1999 |
| JP | 2006-070998 A | 3/2006 |

OTHER PUBLICATIONS

Office Action issued in corresponding Japanese Application No. 2009-010552 dated Mar. 26, 2013, and English translation thereof (4 pages).
English abstract of Japanese Publication No. 2006-070998 published on Mar. 16, 2006, Espacenet database, 2 pages.

* cited by examiner

*Primary Examiner* — Troy Chambers
*Assistant Examiner* — Valentin Craciun
(74) *Attorney, Agent, or Firm* — Osha Liang LLP

(57) ABSTRACT

An object of the present invention is to provide an electric actuator having a structure capable of reducing an external force or impact acting on a screw shaft when a piston rod is at a stretched position. An electric actuator includes a nut, a piston rod, recesses, keys, holes, and a tapered portion. Into the nut, a screw shaft is screwed. The piston rod moves linearly via the nut. The recesses are formed on an outer circumferential surface of the nut. The keys are each provided to a recess. The tapered portion is formed on an inner wall of the cylinder body. The piston rod advances to move the keys outward to cause the keys to fit to the tapered portion to block retraction of the piston rod.

4 Claims, 6 Drawing Sheets

ELECTRIC ACTUATOR

CROSS REFERENCE TO RELATED APPLICATION

The present application claims priority from Japanese Patent Application No. 2008-333366 which was filed on Dec. 26, 2008, and Japanese Patent Application No. 2009-10552 which was filed on Jan. 21, 2009, the disclosures of which are herein incorporated by reference in their entirety.

BACKGROUND OF THE INVENTION

1. Field of the Invention

The present invention relates to an electric actuator, particularly to an electric actuator suitable for lifting an aircraft leg.

2. Description of the Related Art

An example of a technique related to an actuator for lifting an aircraft leg is described in Japanese Unexamined Patent Application Publication No. 1999-59592. The leg-lifting device described in Japanese Unexamined Patent Application Publication No. 1999-59592 intends to achieve a simple layout by unitizing a leg-lifting mechanism including emergency leg-extension. The leg-lifting device includes the following members mounted in a common body: a pump as a hydraulic pressure source; a motor which drives the pump; a rod which extends in response to discharge pressure of the pump; and a mechanical lock mechanism which regulates extension of the rod.

Here, research and development of EMAs (Electro Mechanical Actuator) and EHAs (Electro Hydrostatic Actuator) are worldwide trends in the field of aircraft technology to eliminate the hydraulic system in order to realize a lighter aircraft. As far as lifting systems of lifting devices for aircraft legs are concerned, however, hydraulic actuators still remain as mainstream.

An example of an EMA developed for lifting an aircraft leg is illustrated in FIG. 6. An electric actuator 101 illustrated in FIG. 6 includes a cylinder body 84; a screw shaft 3 provided in the cylinder body 84 and rotated by an electric motor 23; and a piston rod 83 into which a screw shaft 3 is screwed. Further, a mechanical brake 81 is provided in the cylinder body 84. A side face of an end portion of the cylinder body 84 is provided with a limit switch 82.

The electric motor 23 is activated to cause the piston rod 83 to move linearly in an advancing direction (leg-extending direction) or a retracting direction (leg-retracting direction) in accordance with rotation of the piston rod 83. Here, the piston rod 83 moves in the leg-extending direction to cause a piston part 83a of the piston rod 83 to hit the limit switch 82. Upon receiving a signal, the electric motor 23 stops and the mechanical brake 81 is activated. The piston rod 83 is thus arrested and locked at a leg-extending position (stretched position). According to the electric actuator 101, no hydraulic pressure is utilized for driving the piston rod 83. This allows elimination of the hydraulic system which has been traditionally indispensable. Thus, a lighter aircraft is realized.

SUMMARY OF THE INVENTION

Problems to be Solved by the Invention

In the electric actuator 101 illustrated in FIG. 6, however, when the aircraft takes off or lands with the piston rod 83 at the leg-extending position (stretched position), the screw shaft 3 and the mechanical brake 81 are required to receive an external force or impact acting through the piston rod 83; i.e., a heavy load is placed on the screw shaft 3 and the mechanical brake 81. This requires sufficient strength and braking performance of the devices, resulting in a very large member.

The present invention is made in view of the above mentioned condition. Thus, an object of the present invention is to provide an electric actuator which drives a piston rod by an electric motor via a screw shaft, which electric actuator is capable of reducing an external force or impact acting on the screw shaft when the piston rod is at the stretched position.

Means for Solving the Problems and Effects

As a result of an intensive study attempting to solve the above mentioned problem, the present inventors formed a recess on an outer circumferential surface of a nut into which nut a screw shaft is screwed, and provided a key to the recess. In addition, the present inventors formed a tapered portion on an inner wall of the cylinder body, to which tapered portion the key is fitted. Hence, a piston rod advances to move the key outward to cause the key to fit to the tapered portion, locking the piston rod by the key. The present inventors found that the structure solves the above problem, and the present invention is made based on this finding.

In other words, the present invention is an electric actuator including: a cylinder body; a screw shaft; a nut; a piston rod; a recess; a key; a hole; and a tapered portion. The screw shaft is provided in the cylinder body, and is rotated by an electric motor. Into the nut, the screw shaft is screwed. The piston rod moves linearly in accordance with rotation of the screw shaft via the nut. The recess is formed on an outer circumferential surface of the nut. The key is provided to the recess. The hole is provided to an outer circumferential surface of a piston part of the piston rod, and to which hole the key is fitted The tapered portion is formed on an inner wall of the cylinder body, and to which tapered portion the key is fitted. The piston rod advances to move the key outward to cause the key to fit to the tapered portion to block retraction of the piston rod.

According to the structure, when an external force acts on the electric actuator in the retracting direction of the piston rod when the key provided in the recess of the outer circumferential surface of the nut fits to the tapered portion of the inner wall of the cylinder body, the external force is applied to the cylinder body via the key. This reduces an external force acting on the nut into which the screw shaft is screwed, thus reducing an external force or impact acting on the screw shaft. As a result, a smaller and lighter actuator is realized, compared to a known electric actuator.

Further, in the present invention, the recess formed on the nut preferably includes: a first parallel face parallel to an axial direction of the screw shaft; an inclined face inclined outward; and a second parallel face parallel to the axial direction, in this order from a direction in which the piston rod advances to a direction in which the piston rod retracts.

According to the structure, due to the inclined face of the recess of the nut, the key surely moves outward. Further, the second parallel face prevents the key from moving inward. This causes the key to surely block the piston rod from retracting.

Further, in the present invention, the key preferably includes a tapered face which facially contacts the tapered portion formed on the inner wall of the cylinder body.

The structure facilitates inward movement of the key (unlocking) when the piston rod retracts. Further, the facial contact reduces a stress in the contact area, the stress being caused by an external force.

In the present invention, it is preferable that a plurality of keys are provided on the outer circumference of the nut at equal intervals.

The structure allows equal distribution of an external force or impact acting on the keys.

Further, the present invention is an electric actuator including a cylinder body, a screw shaft, a nut, a piston rod, a locking member, a spring, a recess, a key, a hole, and a tapered portion. The screw shaft is provided inside the cylinder body, and rotated by an electric motor. Into the nut, the screw shaft is screwed. The piston rod moves linearly in accordance with rotation of the screw shaft via the nut. The locking member is provided inside a piston part of the piston rod. The spring is provided inside the locking member, and biases the locking member in the advancing direction. The recess is formed on an outer circumferential surface of the locking member. The key is provided to the recess. The hole is provided to an outer circumference of the piston part, and into which hole the key is fitted. The tapered portion is formed on an inner wall of the cylinder body, and to which tapered portion the key is fitted. The piston rod advances to move the key outward to cause the key to fit to the tapered portion to block retraction of the piston rod.

According to the structure, when an external force acts on the electric actuator in the retracting direction of the piston rod when the key provided in the recess of the outer circumferential surface of the locking member is fitted to the tapered portion of the inner wall of the cylinder body, the external force is applied to the cylinder body via the key. This reduces an external force acting on the nut into which the screw shaft is screwed, thus reducing an external force or impact acting on the screw shaft. As a result, a smaller and lighter actuator is realized, compared to a known electric actuator. Further, the spring which biases the locking member in the advancing direction facilitates such a state where retraction of the piston rod is arrested by the key (locked state).

DETAILED DESCRIPTION OF THE PREFERRED EMBODIMENTS

The following describes an embodiment of the present invention with reference to the figures. An actuator described below is for lifting a leg of a small aircraft; however, it is also employable as an actuator for lifting a leg of a medium or large aircraft. Further, the present electric actuator is also suitably employable as an actuator for locking a door (opening/closing a door) or the like of an aircraft. Furthermore, the present electric actuator is applicable to a machine other than aircraft.

(Structure of the Electric Actuator)

Figure 1:
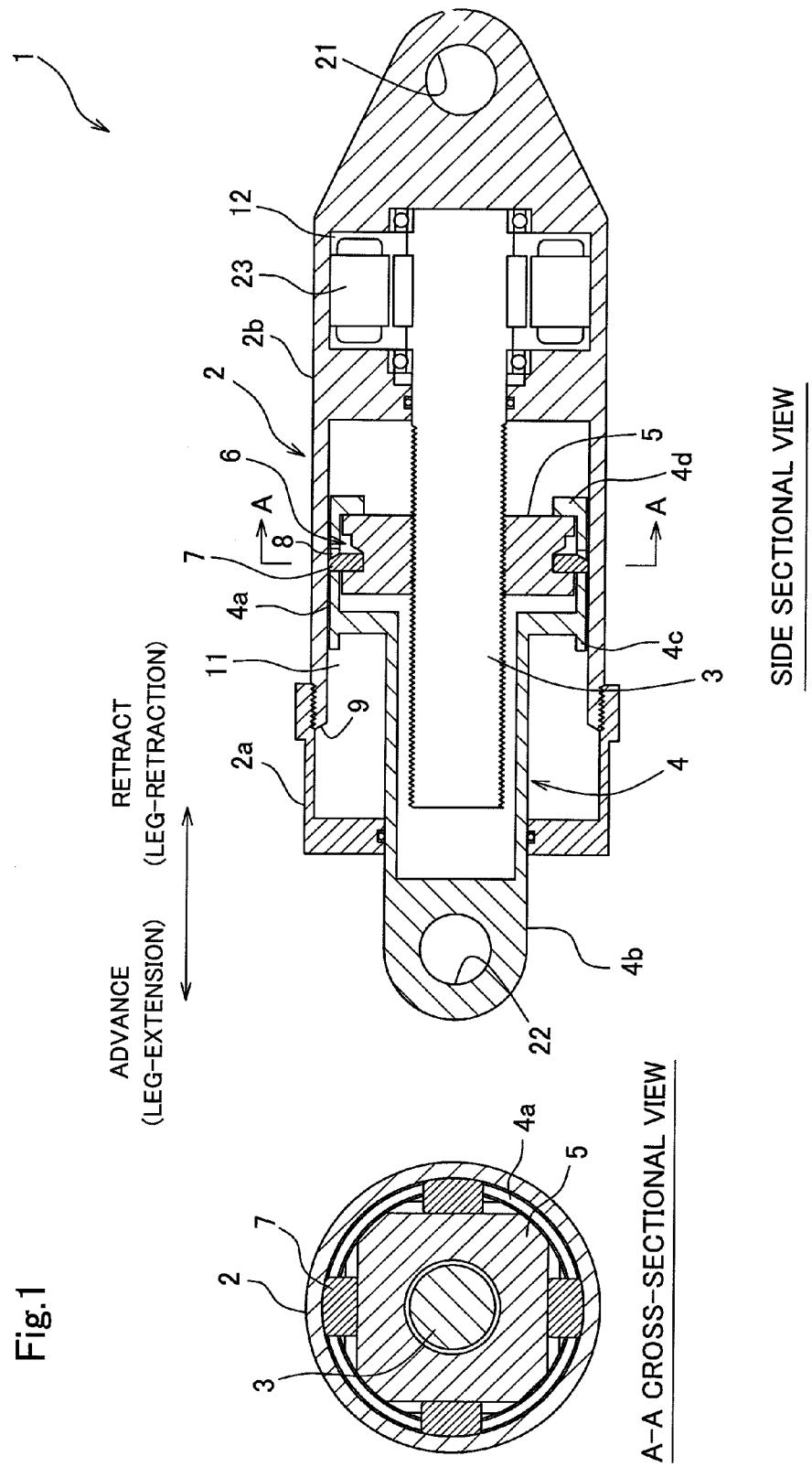
FIG. 1 is a schematic cross-sectional view of an electric actuator according to an embodiment of the present invention.
Figure 2:
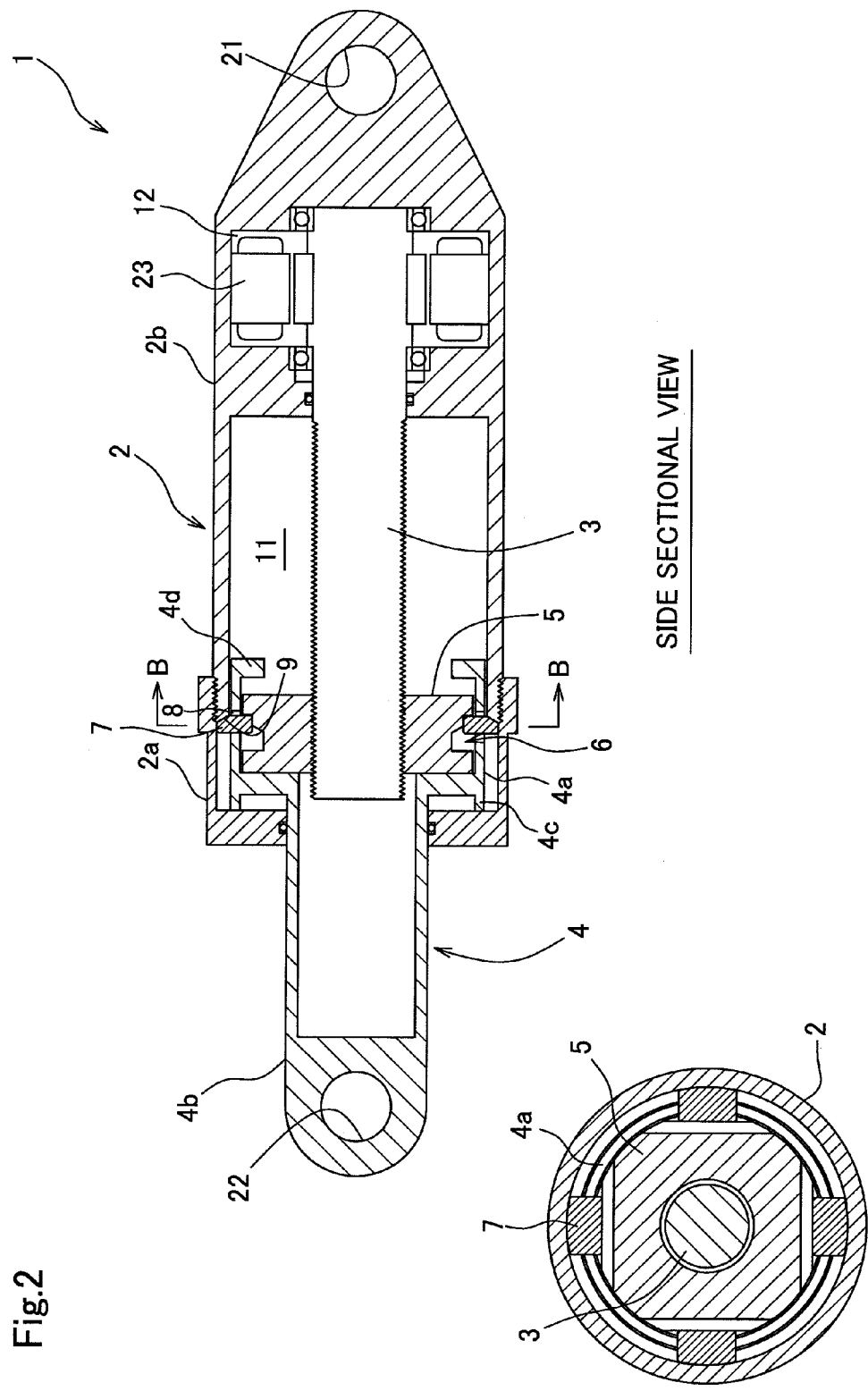
FIG. 2 is a schematic cross-sectional view of the electric actuator illustrated in FIG. 1, with a piston rod at a stretched position.

FIGS. 1 and 2 are schematic cross-sectional views each illustrating an electric actuator 1 according to an embodiment of the present invention. FIG. 1 illustrates the electric actuator 1 with a piston rod 4 at a withdrawal position (retracted position). FIG. 2 illustrates the electric actuator 1 with the piston rod 4 at a stretched position (advanced position).

As illustrated in FIGS. 1 and 2, the electric actuator 1 includes: a cylinder body 2; and an electric motor 23, a screw shaft 3, a nut 5, keys 7, and a piston rod 4 provided in the cylinder body 2.

(Cylinder Body)

The cylinder body 2 includes a cylinder chamber 11 and a motor chamber 12. The cylinder chamber 11 is formed to a side of the cylinder body 2, to which side a leg of an aircraft is mounted. The motor chamber 12 is formed to a fuselage side of the cylinder body 2. The cylinder body 2 has a cylindrical shape, and is constituted of a main casing 2b and a cover casing 2a. Provided to an end portion of the fuselage side of the main casing 2b is an attach member 21 which attaches the cylinder body 2 to the fuselage. Formed to an end portion of the cover casing 2a is an opening for the piston rod 4. Further, the main casing 2b and the cover casing 2a are screwed together, the main casing 2b serving as a male side and the cover casing 2a serving as a female side. Note that the main casing 2b and the cover casing 2a may be jointed by a flange. In addition, note that the leg of the aircraft includes a wheel and an arm of the wheel of the aircraft.

An end face of the main casing 2b is machined to be inclined, which main casing 2b is located in a direction where the leg of the aircraft is attached. This inclined portion is a tapered portion 9 to which later-described keys 7 are fitted, the keys 7 being formed on an inner wall of the cylinder body 2. Note that the tapered portion 9 is not required to be formed in the manner as in the present embodiment. For instance, a side wall of the cylinder body 2 may be provided with a hole (through hole) which is at least partially narrowed, and an inclined face of the narrowed portion may serve as the tapered portion 9.

(Electric Motor)

Figure 6:
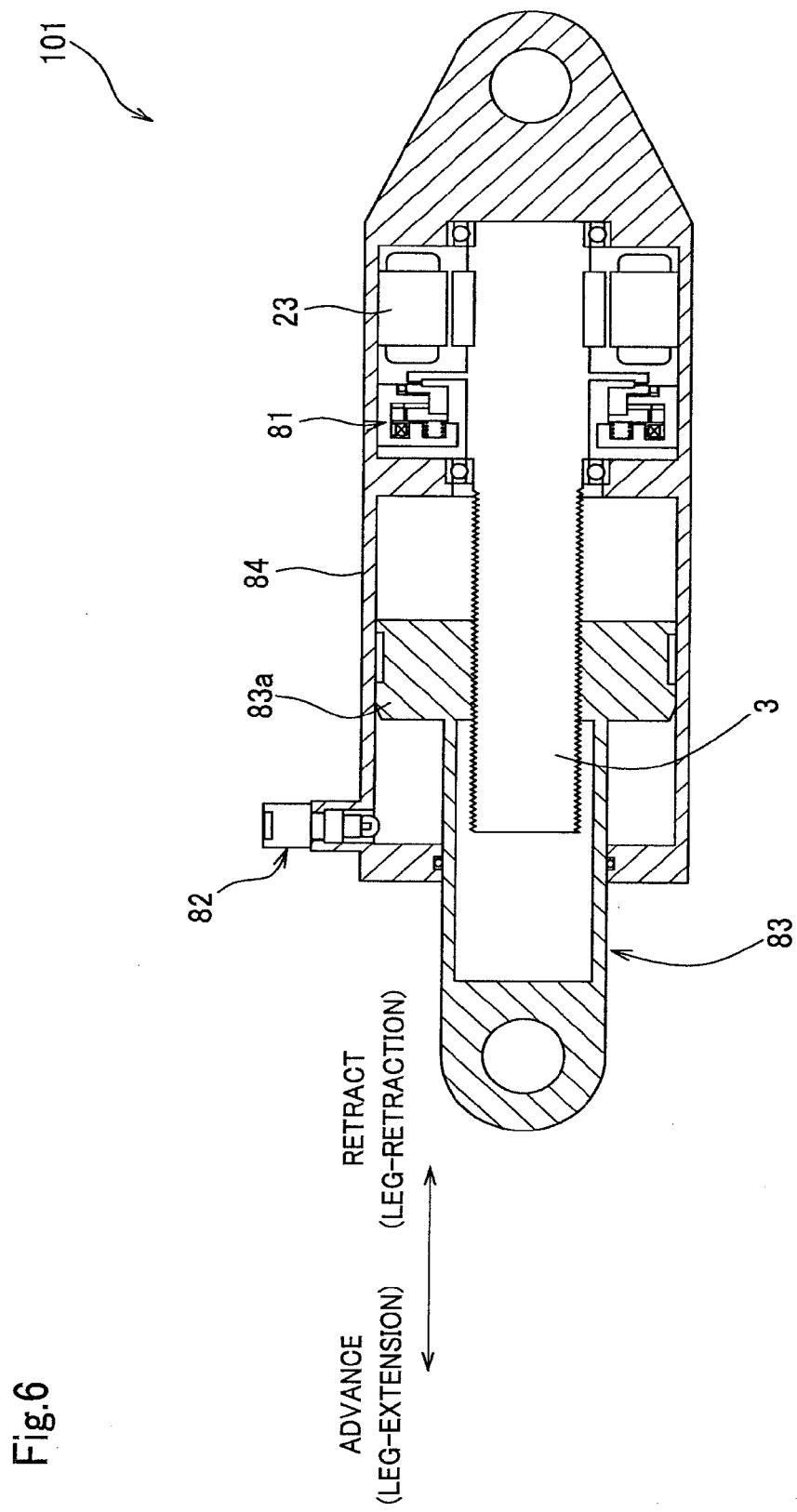
FIG. 6 is a schematic cross-sectional view of an electric actuator according to conventional art.

The electric motor 23 is for rotating the later-described screw shaft 3. The electric motor 23 is provided to the motor chamber 12. The electric motor 23 has an angle detector (not-illustrated) such as an encoder, resolver, or hall sensor built therein. The electric motor 23 can be halted at any position by a signal from the detector. Note that a necessary number of limit switches 82 illustrated in FIG. 6 or the like may be provided to the cylinder body 2, each of the limit switches 82 being set to operate at a position that the piston rod 4 is intended to be stopped, and the electric motor 23 may be halted by a signal from any one of the limit switches 82. Further, the electric motor 23 may be halted when an increased load on the electric motor 23 is detected.

Note that an electromagnetic brake as a brake for parking may be incorporated into the electric actuator 1. An incorporated electromagnetic brake can prevent the piston rod 4 at the withdrawal position (retracted position) from moving in an advance side (leg-extending side) due to its own weight or an empty weight of the leg of the aircraft or the like. Note that the braking performance (brake performance) of the electromagnetic brake is required to merely arrest movement of the piston rod 4 in the advance side (leg-extending side) caused by its own weight. Thus, no further function is required of the electromagnetic brake.

(Screw Shaft)

Attached to the electric motor 23 is the screw shaft 3. The screw shaft 3 is provided in the cylinder chamber and the motor chamber 12 in such a manner that a threaded portion of the screw shaft 3 is present in the cylinder chamber 11. Further, the screw shaft 3 is screwed into the nut 5. The electric motor 23 rotates the screw shaft 3, causing the nut 5 to move linearly.

(Nut)

The nut 5 has a substantially rectangular shape, as illustrated in the A-A cross-sectional view of the electric actuator 1, the cross-sectional view being shown in FIG. 1. Four faces of an outer circumferential surface of the nut 5 are each provided with a recess 6, as illustrated in the side sectional view lying to the right of the cross-sectional view taken along the A-A line. The four faces each have a straight cross-sectional shape. As illustrated in detail in FIG. 3(a) and the like, the recesses 6 of the nut 5 each include: a first parallel face 6a parallel to an axial direction of the screw shaft 3; an inclined face 6b inclined outward; and a second parallel face 6c parallel to the axial direction of the screw shaft 3, in this order from the direction in which the piston rod 4 advances towards the direction in which the piston rod 4 retracts. Note that the second parallel face 6c is located more outward than the first parallel face 6a with respect to a direction perpendicular to the axial direction.

Thus, each of the recesses 6 is a groove formed on the outer circumferential surface of the nut 5, the recess having the first parallel face 6a, the inclined face 6b, and the second parallel face 6c.

(Key)

Further, the recesses 6 of the nut 5 are each provided with a key 7. The keys 7 each have a substantially rectangular shape as illustrated in the A-A cross sectional view in FIG. 1. Note that one face of each of the keys 7 has an arc shape to match the inner wall of the cylinder body 2. Further, one corner portion of each of the keys 7 is chamfered to allow facial contact with the tapered portion 9 formed on the end face of the main casing 2b, as illustrated in the side sectional view of the keys 7 shown on the right of the A-A cross-sectional view. The one corner portion of each of the keys 7 serves as a tapered face 7a (see FIG. 3(a) and the like). In the present embodiment, four keys 7 are provided at equal intervals on the outer circumference of the nut 5.

(Piston Rod)

The cylinder chamber 11 is provided with the piston rod 4 therein. The piston rod 4 includes a rod part 4b and a piston part 4a. An end portion of the rod part 4b is provided with an attach member 22 to which the leg of the aircraft is attached. The piston part 4a moves linearly (slides) along the inner wall of the cylinder body 2.

Here, the rod part 4b is a hollow cylinder, into which the screw shaft 3 is inserted. Next, an end portion of the piston part 4a, which end portion is located in a direction in which the piston rod 4 advances, is provided with a ring protrusion 4c. Further, on an end portion of the piston part 4a, which end portion is located in a direction in which the piston rod 4 retracts, is provided with a ring engaging member 4d. The engaging member 4d engages with the nut 5 when the piston rod 4 retracts (withdraws).

Further, an outer circumference of the piston part 4a, which outer circumference is located between the protrusion 4c and the engaging member 4d are holes 8 into each of which holes 8 any one of the keys 7 is fitted. Each of the hole 8 is a hole formed long in a circumferential direction of the piston part 4a, based on dimensions of the keys 7.

(Operation of the Electric Actuator)

Figure 3:
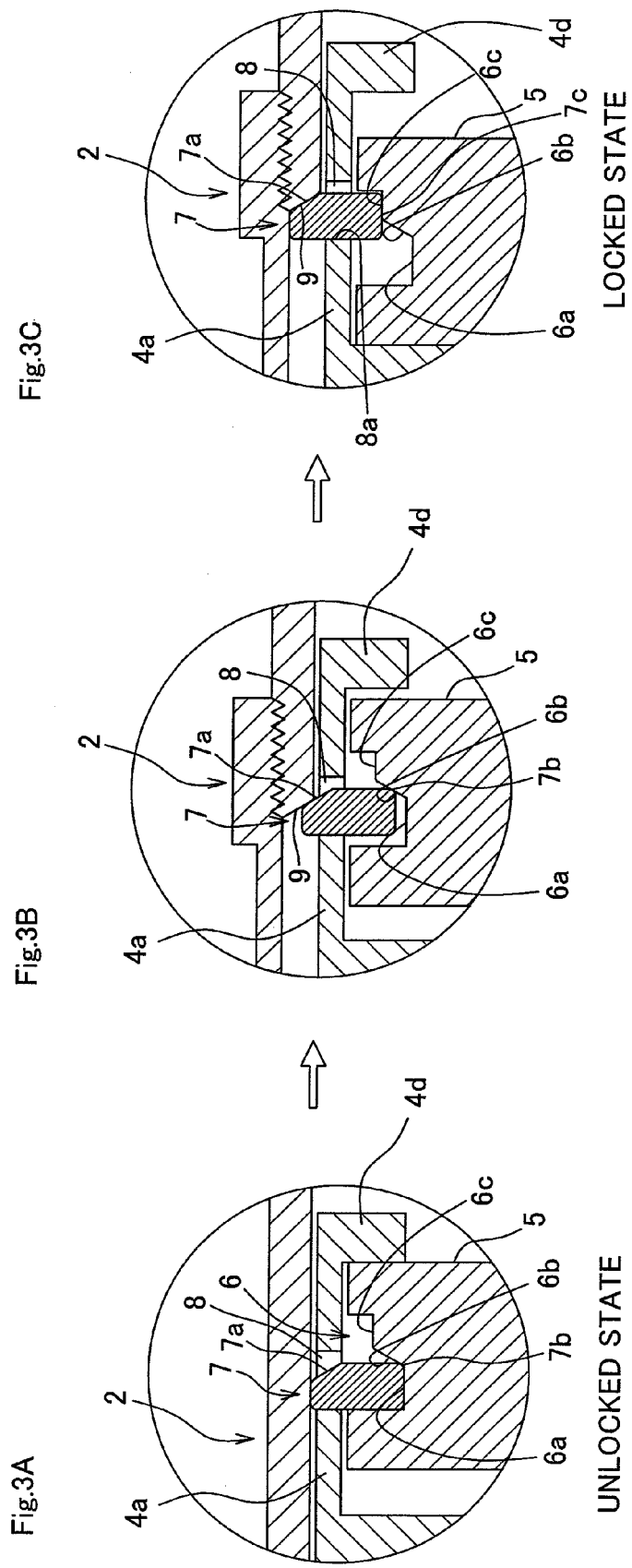
FIG. 3 illustrates movement of a key while a piston rod is advancing.
Figure 4:
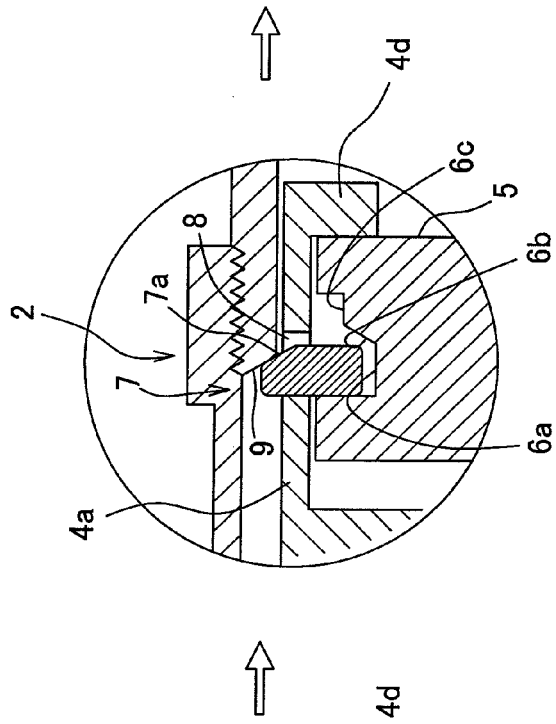
FIG. 4 illustrates movement of a key while a piston rod is retracting.

The following describes operation of the electric actuator 1. Here, FIG. 3 illustrates movement of the key 7 while the piston rod is advancing. FIG. 4 illustrates movement of the key 7 while the piston rod is retracting.

(Advancement of the Piston Rod)

First, the following describes movement of the piston rod from a withdrawal position (retracted position) (FIG. 1) to a stretched position (advanced position) (FIG. 2). When a control unit of the aircraft gives a command to extend the leg, the electromagnetic motor 23 is driven. This rotates the screw shaft 3, causing the piston rod 4 to advance with the nut 5. Here, a force from the electric motor 23 is transferred sequentially to the screw shaft 3, the nut 5, the keys 7, and the piston rod 4. This causes the piston rod 4 to advance straightforward.

Here, as illustrated in FIG. 3(b), when the keys 7 reach the tapered portion 9 formed on the inner wall of the cylinder body 2, the keys 7 each move outward along the inclined face 6b (with the corner portion 7b of the key 7 matching the inclined face 6b), due to the inclined face 6b of each of the recesses 6 formed on the nut 5, and the forward force of the nut 5. This causes the keys 7 to fit to the tapered portion 9.

When the nut 5 further advances, a bottom face of each of the keys 7 reaches the second parallel face 6c of the recess 6, as illustrated in FIG. 3(c). In the instant that the bottom face of the key 7 has reached the second parallel face 6c of the recess 6, the electric motor 23 is halted by a signal from the encoder. This represents a condition where the piston rod 4 is locked at the stretched position (advanced position). Retraction of the piston rod 4 is arrested by the keys 7. Thus, when an external force acts in the retracting direction of the piston rod 4, the external force is applied to the cylinder body 2 via the keys 7. This reduces an axial external force acting on the nut 5 into which the screw shaft 3 is screwed. Movement of the keys 7 towards an axial center of the screw shaft 3 is blocked by the second parallel faces 6c of the recesses 6, to maintain engagement to the tapered portion 9. This causes the keys 7 to receive an external force or impact acting in the retracting direction of the piston rod 4. Advancement of the piston rod 4 is arrested by the ring protrusion 4c of the piston part 4a.

Here, as in the present embodiment, it is preferable that a thickness (axial dimension) of each of the keys 7, an axial length of each of the second parallel faces 6c, and an axial length of each of the first parallel faces 6a are each determined so as to allow an inner face 8a (see FIG. 3(c)) of each of the holes 8 to maintain contact with the key 7, the holes 8 being formed to the piston part 4a. Thus, the keys 7 each do not come off due to its own weight or the like during a locked state illustrated in FIG. 3(c).

Even in case of a failure in an electrical system, the keys 7 fit to the tapered portion 9 formed on the inner wall of the cylinder body 2. This allows the piston rod 4 to remain locked.

(Retraction of the Piston Rod)

When the control unit of the aircraft gives a command to retract the leg, the electric motor 23 is driven in the opposite direction. Here, the surroundings of each of the keys 7 move from a condition illustrated in FIG. 3(c) to a condition illustrated in FIG. 4(a). In other words, the electric motor 23 is driven to cause the nut 5 to start retracting first. Thereafter, the second parallel face 6c of each of the recesses 6 of the nut 5 escapes from the bottom face of the key 7, and when an end face of the nut 5 hits the engaging member 4d of the piston part 4a, the piston rod 4 retracts with the nut 5. Here, each of the key 7 moves towards the axial center along the inclined face 6b of the recess 6, due to the inclined face 6b and an retraction force of the nut 5 (or the piston part 4a), as illustrated in FIG. 4(b).

When the nut 5 further retracts, the bottom face of the key 7 reaches the first parallel face 6a of the recess 6, as illustrated in FIG. 4(c). This unlocks retraction of the piston rod 4. Further, in the instant that the piston rod 4 has reached the withdrawal position (retracted position) (determined by a signal from the encoder or the like or the limit switch 82), the electric motor 23 is halted.

As described above, according to the electric actuator 1 of the present invention, when an external force acts on the electric actuator 1 in the retracting direction of the piston rod 4 when the keys 7 provided to the recesses 6 of the nut 5 fit to the tapered portion 9 on the inner wall of the cylinder body 2, the external force is applied to the cylinder body 2 via the keys 7. This reduces the force acting on the nut 5 into which the screw shaft 3 is screwed, thus reducing an external force or impact acting on the screw shaft 3. As a result, a smaller and lighter actuator is realized, compared to a known electric actuator.

Further, due to the inclined faces 6b of the recesses 6 of the nut 5, the keys 7 surely move outward when the piston rod 4 advances. Note that the cylinder chamber 11 is lubricated with oil in order to prevent damage to the keys 7 and the other members, as well as to facilitate the movement of the keys 7. An angle of inclination of the inclined face 6b with respect to the axial direction is determined arbitrarily.

Note that the inclined face 6b is not required on each of the recesses 6 of the nut 5. In other words, the recesses 6 may each include the first parallel face 6a and the second parallel face 6c, in this order form the direction in which the piston rod 4 advances towards the direction in which the piston rod 4 retracts (same applies to another embodiment). In this case, the corner portion 7b of each of the keys 7 serves as an inclined face. Furthermore, the inclined face 6b may be provided to each of the recess 6 of the nut 5, and the corner portion 7b of the key 7 may also serve as an inclined face (same applies to another embodiment).

Further, the tapered face 7a of each of the keys 7 is formed in such a manner that the tapered face 7a facially contacts the tapered portion 9 formed on the inner wall of the cylinder body 2. This facilitates the movement of the keys 7 towards the axial center (unlocking) when the piston rod 4 retracts. Further, this reduces the stress in the contact area (contact area between the tapered portion 9 of the cylinder body 2 and the tapered face 7a of each of the keys 7), the stress being caused by the external force acting on the piston rod 4.

Further, four keys 7 are provided on the outer circumference of the nut 5 at equal intervals. This distributes the external force or impact equally to the four keys 7, the external force or impact acting on the keys 7. Note that the number of keys to be provided on the outer circumference of the nut 5 (at equal intervals) may be two or three, or five or more (same applies to another embodiment). Further, a single key 7 is adequate to lock the piston rod 4, thus the number of keys 7 to be provided may be one (same applies to another embodiment).

Another Embodiment

Figure 5:
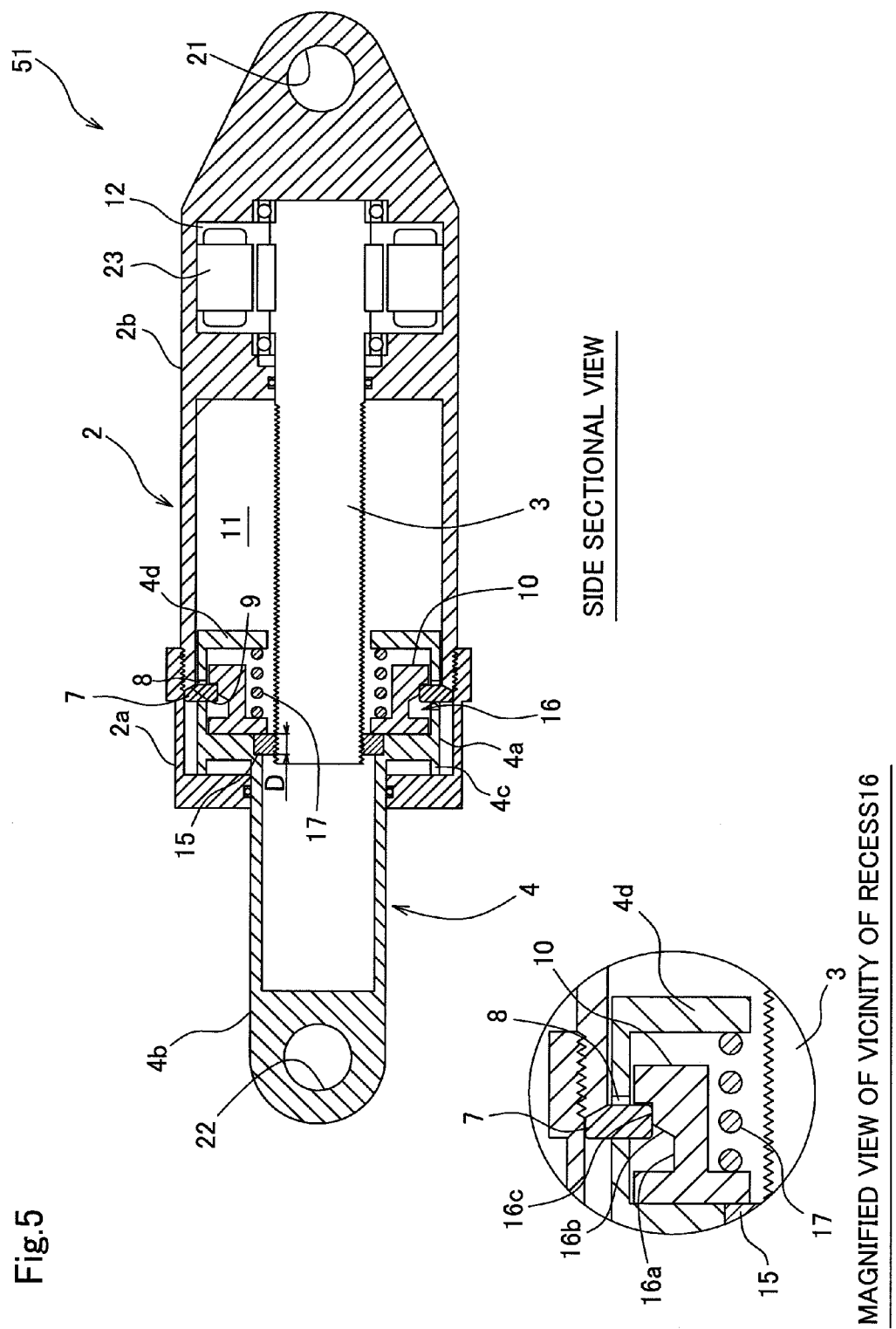
FIG. 5 is a schematic cross-sectional view of an electric actuator according to another embodiment.

FIG. 5 is a schematic cross-sectional view of an electric actuator 51 according to another embodiment, with the piston rod 4 at the stretched position. Note that the same members as in the electric actuator 1 illustrated in FIGS. 1 to 4 are denoted by the same reference numbers, without specific descriptions thereof.

The electric actuator 51 of the present embodiment differs from the electric actuator 1 illustrated in FIGS. 1 to 4, mainly in the shape and the dimensions of the nut into which the screw shaft is screwed, and in that the electric actuator 51 includes a locking member 10 and a spring 17, unlike the electric actuator 1.

(Nut)

As illustrated in FIG. 5, a nut 15 of the electric actuator 51, into which nut 15 the screw shaft 3 is screwed, does not include such recesses 6 as formed on the outer circumference of the nut 5 of the electric actuator 1. Further, a length D of a threaded portion of the nut (length of a portion into which the screw shaft 3 is screwed) is shorter than a length of a threaded portion of the nut 5. The short length D of the threaded portion of the nut 15 prevents a rotation failure of the screw shaft 3 which may possibly occur between the screw shaft 3 and the nut 15, as well as realizing a lighter electric actuator. Note that the nut 15 is formed in such a manner that the nut 15 fits into an indentation formed on an end face of the rod part 4d of the piston rod 4, which end face is located in the direction in which the piston rod 4 retracts.

(Locking Member)

Inside the piston part 4a of the piston rod 4 is a locking member 10 provided thereto. Although a cross-sectional view of the locking member 10 seen from a front side (a view corresponding to the B-B cross-sectional view in FIG. 2) is omitted here, the locking member 10 has a substantially rectangular shape in front view as the nut 5 of the electric actuator 1. As the nut 5, four faces of an outer circumferential surface of the locking member 10 are each provided with a recess 16, the four faces each having a straight cross-sectional shape (illustration omitted. See B-B cross-sectional view in FIG. 2 for nut 5 having the same structure as locking member 10). Further, as illustrated in the magnified view of a vicinity of the recess 16, the recesses 16 of the locking member 10 each include: a first parallel face 16a parallel to an axial direction; an inclined face 16b which is inclined outward; and a second parallel face 16a parallel to the axial direction, in this order from a direction in which the piston rod 4 advances to the direction in which the piston rod 4 retracts. Note that the second parallel portion 16c is formed more outward than the first parallel portion with respect to a direction perpendicular to the axial direction. Thus, the recess 16 includes the first parallel face 16a, the inclined face 16b, and the second parallel face 16c, which are formed on an outer circumferential surface of the locking member 10.

Note that four keys 7 (illustration omitted) are provided on an outer circumference of the locking member at equal intervals, as the nut 5 of the electric actuator 1.

(Spring)

Inside the locking member 10 is a spring 17 provided thereto. The spring 17 is a coil spring which biases the locking member 10 in an advancing direction thereof. On an end of the piston part 4a towards which part the piston rod 4 retracts, a ring engaging member 4d is provided. The engaging member 4d of the electric actuator 51 extends longer towards the axial center than the engaging member 4d of the electric actuator 1 does. The spring 17 is disposed compressed between the locking member 10 and the engaging member 4d.

(Advancement of the Piston Rod)

The following describes movement of the piston rod 4 when moving from the withdrawal position (retracted position) to the stretched position (advanced position) (FIG. 5). When the control unit of the aircraft gives a command to extend the leg, the electric motor 23 is driven. This rotates the screw shaft 3, causing the nut 15 to push an inner diameter end of the piston part 4a to advance the piston rod 4. Under such a circumstance, a force from the electric motor 23 is sequentially transferred to the screw shaft 3, the nut 15, and the piston rod 4, causing the piston rod 4 to advance straightforward.

Here, when the keys 7 reach the tapered portion 9 on the inner wall of the cylinder body 2, the keys 7 each move outward along the inclined face 16b (with the corner portion 7b of the key 7 matching the inclined face 16b), due to the inclined face 16b of each of the recesses 16 of the locking member 10, and the forward force of the locking member 10. This causes the keys 7 to fit to the tapered portion 9. Under such a circumstance, the spring supports advancement of the locking member 10. In other words, the spring 17 supports outward movement of the keys 7.

When the nut 15 further advances, the bottom face of each of the keys 7 reaches the second parallel face 16c of the recess 16. In the instant that the keys 7 each have reached the second parallel face 16c of the recess 16, the electric motor 23 is halted by a signal from the encoder. This represents a condition where the piston rod 4 is locked at the stretched position (advanced position). Retraction of the piston rod 4 is arrested by the keys 7, and when an external force acts in the retracting direction of the piston rod 4, the external force is applied to the cylinder body 2 via the keys 7. This reduces an axial external force acting on the nut 5 into which the screw shaft 3 is screwed. Movement of the keys towards the axial center is blocked by the second parallel faces 16c of the recesses 16, to maintain engagement to the tapered portion 9. This causes the keys to receive an external force or impact acting in the retracting direction of the piston rod 4. Advancement of the piston rod 4 is arrested by the ring protrusion 4c of the piston part 4a.

Thus, according to the electric actuator 51 of the present embodiment, the biased force of the spring 17 facilitates such a state where retraction of the piston rod 4 is blocked by the key (locked state).

(Retraction of the Piston Rod)

When the control unit of the aircraft gives a command to retract the leg, the electric motor 23 is driven in the opposite direction. Under such a circumstance, the nut 15 starts retracting. The locking member 10 also retracts in accordance with the retraction of the nut 15, causing the second parallel face 16c of each of the recesses 16 of the locking member 10 to escape from the bottom face of the key 7. Eventually, the bottom face of the key 7 reaches the first parallel face 16a of the recess 16. This unlocks retraction of the piston rod 4. Further, the retraction of the nut 15 causes the spring 17 to be compressed. As the spring 17 is being compressed, an end face of the locking member 10 hits the engaging member 4d of the piston part 4a, causing the piston rod 4 to retract thereafter. Note that depending on the spring force of the spring 17, the piston rod 4 starts retracting before the end face of the locking member 10 hits the engaging member 4d of the piston part 4a. In the instant that the piston rod 4 has reached the withdrawal position (retracted position) (determined by an signal from the encoder or the limit switch 82), the electric motor 23 is halted.

The foregoing has described the embodiment of the present invention. The present invention, however, is not limited to the above embodiment, and thus various changes can be made to the present invention without departing from the scope of the claims.

What is claimed is:

1. An electric actuator comprising:
   a cylinder body;
   a screw shaft which is provided in the cylinder body, and rotated by an electric motor;
   a nut into which the screw shaft is screwed;
   a piston rod which moves linearly in accordance with rotation of the screw shaft via the nut;
   a recess formed on an outer circumferential surface of the nut;
   a key provided to the recess;
   a hole which is formed on an outer circumference of a piston part of the piston rod, and into which hole the key is fitted;
   a tapered portion formed on an inner wall of the cylinder body and to which the key is fitted; and
   a ring engaging member formed on an end of the piston part towards which part the piston rod retracts,
   wherein a rear end face of the nut does not contact the engaging member when the piston rod advances,
   wherein the piston rod advances to move the key outward to cause the key to fit to the tapered portion to block retraction of the piston rod,
   wherein when the piston rod retracts, the nut retracts and the rear end face of the nut contacts the engaging member, with the result that the piston rod retracts together with the nut and wherein during a transition between the retraction and the advancement of the piston rod, the rear end face of the nut does not contact the piston rod.

2. The electric actuator according to claim 1, wherein the recess of the nut includes:
   a first parallel face parallel to an axial direction of the screw shaft;
   an inclined face inclined outward; and
   a second parallel face parallel to the axial direction, in this order from a direction in which the piston rod advances to the direction in which the piston rod retracts.

3. The electric actuator according to claim 1, wherein the key includes a tapered face which facially contacts the tapered portion on the inner wall of the cylinder body.

4. The electric actuator according to claim 1, wherein a plurality of the keys are provided on an outer circumference of the nut at equal intervals.

\* \* \* \* \*